United States Patent
Ye et al.

(10) Patent No.: US 8,971,574 B2
(45) Date of Patent: Mar. 3, 2015

(54) ORIENTATION CORRECTION METHOD FOR ELECTRONIC DEVICE USED TO PERFORM FACIAL RECOGNITION AND ELECTRONIC DEVICE THEREOF

(71) Applicant: CyWee Group Limited, Tortola (VG)

(72) Inventors: Zhou Ye, Foster City, CA (US); Ying-Ko Lu, Taoyuan County (TW); Sheng-Wen Jeng, Tainan (TW)

(73) Assignee: Ulsee Inc., Taipei (TW)

( * ) Notice: Subject to any disclaimer, the term of this patent is extended or adjusted under 35 U.S.C. 154(b) by 83 days.

(21) Appl. No.: 13/684,163

(22) Filed: Nov. 22, 2012

(65) Prior Publication Data

US 2013/0129145 A1 May 23, 2013

Related U.S. Application Data

(60) Provisional application No. 61/562,443, filed on Nov. 22, 2011.

(51) Int. Cl.
*G06K 9/00* (2006.01)
*G06K 9/22* (2006.01)
*G06K 9/32* (2006.01)

(52) U.S. Cl.
CPC ............ *G06K 9/00221* (2013.01); *G06K 9/228* (2013.01); *G06K 9/3275* (2013.01)
USPC .......................................................... 382/103

(58) Field of Classification Search
None
See application file for complete search history.

(56) References Cited

U.S. PATENT DOCUMENTS

| | | | |
|---|---|---|---|
| 7,869,630 B2 * | 1/2011 | Matsuhira | 382/118 |
| 8,593,558 B2 * | 11/2013 | Gardiner et al. | 348/333.12 |
| 8,705,812 B2 * | 4/2014 | Karakotsios et al. | 382/118 |
| 2005/0104848 A1 * | 5/2005 | Yamaguchi et al. | 345/156 |
| 2006/0222264 A1 * | 10/2006 | Guitarte Perez et al. | 382/296 |
| 2008/0239131 A1 * | 10/2008 | Thorn | 348/333.01 |
| 2011/0249142 A1 * | 10/2011 | Brunner | 348/229.1 |
| 2012/0081392 A1 * | 4/2012 | Arthur | 345/633 |
| 2013/0169821 A1 * | 7/2013 | Steinberg et al. | 348/169 |

* cited by examiner

*Primary Examiner* — Shervin Nakhjavan
(74) *Attorney, Agent, or Firm* — Ding Yu Tan

(57) ABSTRACT

A method of performing facial recognition and tracking of an image captured by an electronic device includes: utilizing a camera of the electronic device to capture an image including at least a face; displaying the image on a display screen of the electronic device; determining a degree of orientation of the electronic device; and adjusting an orientation of scanning lines used to scan the image for performing face detection so that the orientation of the scanning lines corresponds to the orientation of the electronic device.

10 Claims, 11 Drawing Sheets

ORIENTATION CORRECTION METHOD FOR ELECTRONIC DEVICE USED TO PERFORM FACIAL RECOGNITION AND ELECTRONIC DEVICE THEREOF

CROSS REFERENCE TO RELATED APPLICATIONS

This application claims priority of U.S. Provisional Application No. 61/562,443, which was filed on Nov. 22, 2011.

BACKGROUND OF THE INVENTION

1. Field of the Invention

The invention relates to facial recognition and tracking, and more particularly, to an orientation correction method for scan lines which are used to perform face detection on an image, such that tracking/recognition can be performed continuously regardless of a degree of orientation of a device used to capture the image, and a device thereof.

2. Description of the Prior Art

The recent developments in 3G and 4G technology have given rise to a huge increase in the number of people who own personal electronic devices. Smart phones and tablet devices are now ubiquitous in everyday life. Manufacturers are constantly seeking ways to differentiate their product from the many others available on the market. One way is to integrate various existing applications of the personal electronic device for increasing the ease of use and number of functions available to a user.

Even the most basic smart phone or tablet comes equipped with a dedicated camera which can capture both images and live video. Facial recognition technology can be used on a captured image to perform other applications: for example, a personalized unlocking procedure, whereby an image is captured by the camera and scanning lines within a frame defined on the image are used to determine the user's identity. The camera can also be used in conjunction with video chat applications such as Skype.

When a smart phone is first turned on, the phone is typically held in a 'portrait' position. An image of a user captured by the dedicated camera will therefore also be displayed on the screen in a portrait position. As the phone is rotated over 90 degrees to a 'landscape' position, sensors in the phone will determine a degree of orientation. Beyond a certain threshold (typically 45 degrees), the displayed image will be flipped. When performing face detection as pre-processing of facial tracking/recognition, however, the frame used to scan an image and the corresponding scan lines will not change with the orientation of the phone. Please refer to FIG. 1 which illustrates three degrees of orientation of an electronic device 10. In the following, the electronic device 10 is a phone 10, but this is merely for exemplary purposes.

As illustrated in the diagrams, the phone 10 is equipped with a camera 12 and a display screen 16. A frame 14 is defined on the display screen 16 and used for scanning an image, and the scan lines run in a horizontal direction across the display screen 16 from left to right. In FIG. 1A, the phone 10 is held in the standard 'portrait' position, and the frame 14 used for scanning a face is also in a portrait position. In FIG. 1B, the phone 10 is rotated to 45 degrees. As this degree of orientation is at the threshold at which the displayed image will flip, the image is displayed in a landscape position but the frame 14 and scan lines used for performing face detection are at a 45 degree angle with respect to the face. The scanning lines will therefore not detect the user's face image, as they are no longer scanning the image horizontally from left to right. In FIG. 1C, the phone 10 has been rotated through 90 degrees, and the frame 14 now has scan lines which are vertical rather than horizontal. In both FIG. 1B and FIG. 1C, the face detection will fail, which means the method cannot proceed to the facial recognition step. Standard smart phones/tablets are therefore limited to holding the device in one position for performing facial recognition.

As detailed above, the camera 12 incorporated into a standard smart phone 10 can also be used to perform facial tracking; for example, when using Skype. For this application, the face detection first has to be performed. Please refer to FIG. 2 which is a flowchart showing a method of performing complete functions of a facial tracking/recognition system according to the prior art. The steps are as follows:

Step 200: Start.
Step 202: Face detection.
Step 204: Is face detection ok? If yes, go to Step 206; if no, go to Step 210.
Step 206: Perform face tracking.
Step 208: Is face tracking ok? If yes, return to Step 206; if no, go back to Step 202.
Step 210: Perform error handling; go to Step 202.

As shown in Step 204, once face detection is confirmed then tracking can be performed. If, however, the image is lost during tracking, face detection will need to be performed again. As face detection can only work when the phone is held in a portrait position, the phone must be rotated back to the original portrait position (error handling). This can be quite inconvenient for a user.

SUMMARY OF THE INVENTION

It is therefore an objective of the present invention to provide a system and method which can adjust scan lines used to perform face detection in accordance with a degree of orientation of an electronic device, such that continuous tracking/recognition can be performed and greater convenience of use of the electronic device can be realized.

A method of performing facial recognition and tracking of an image captured by an electronic device according to an exemplary embodiment of the invention comprises: utilizing a camera of the electronic device to capture an image including at least a face; displaying the image on a display screen of the electronic device; determining a degree of orientation of the electronic device; and adjusting an orientation of scanning lines used to scan the image for performing face detection so that the orientation of the scanning lines corresponds to the orientation of the electronic device. A degree of orientation of the electronic device is determined by defining three axes of orientation of the electronic device in an origin position and in an initial position, and when the electronic device is moved from the initial position to a new position, determining a degree of rotation of at least two of the defined axes. The origin position corresponds to the electronic device being held in a flat position, and the initial position corresponds to the electronic device being held in an upright portrait position.

A related electronic device which can perform facial recognition and tracking of an image comprises: a camera for capturing an image including at least a face; a display screen for displaying at least the image; a motion sensor for determining a degree of orientation of the electronic device; and a Central Processing Unit (CPU) for adjusting an orientation of scanning lines used to scan the image for performing face detection so that the orientation of the scanning lines corresponds to the orientation of the electronic device.

These and other objectives of the present invention will no doubt become obvious to those of ordinary skill in the art after reading the following detailed description of the preferred embodiment that is illustrated in the various figures and drawings.

DETAILED DESCRIPTION

As detailed in the background, sensors in a conventional smart phone or tablet will cause a displayed image to flip when the device is rotated beyond a certain threshold, but a frame and scan lines used for performing face detection on the image will not change orientation accordingly. When performing face detection, therefore, an error will be returned when the electronic device is not in the standard portrait position. Further, once face detection has been confirmed and facial tracking/recognition has begun, any interruption in the procedure (for example, something passing between the image and the camera) will require face detection to be performed again. If the electronic device is not in the portrait position when this happens, face detection will fail.

The present invention therefore aims to provide a system which can use sensors existing in a smart phone or tablet, etc. to adjust a degree of orientation of the frame and scan lines used for performing face detection, such that the orientation of the frame and scan lines will always be in accordance with the orientation of a captured image (and the orientation of the electronic device). Please refer to FIG. 5A, FIG. 5B and FIG. 5C, which illustrate the means for determining orientation according to an exemplary embodiment.

As shown in FIG. 5, three axes (x, y and z) are defined, wherein movement in the x axis is called the pitch, movement in the z axis is called the roll, and movement in the y axis is called the azimuth, or yaw. Each Cartesian co-ordinate has a corresponding Euler angle ($\phi$, $\theta$, $\omega$) which defines the degree of rotation/difference from origin. A change in the pitch is defined by the angle $\omega$, a change in the roll is defined by the angle $\omega$, and a change in the yaw is defined by the angle $\theta$.

Figure 5A:
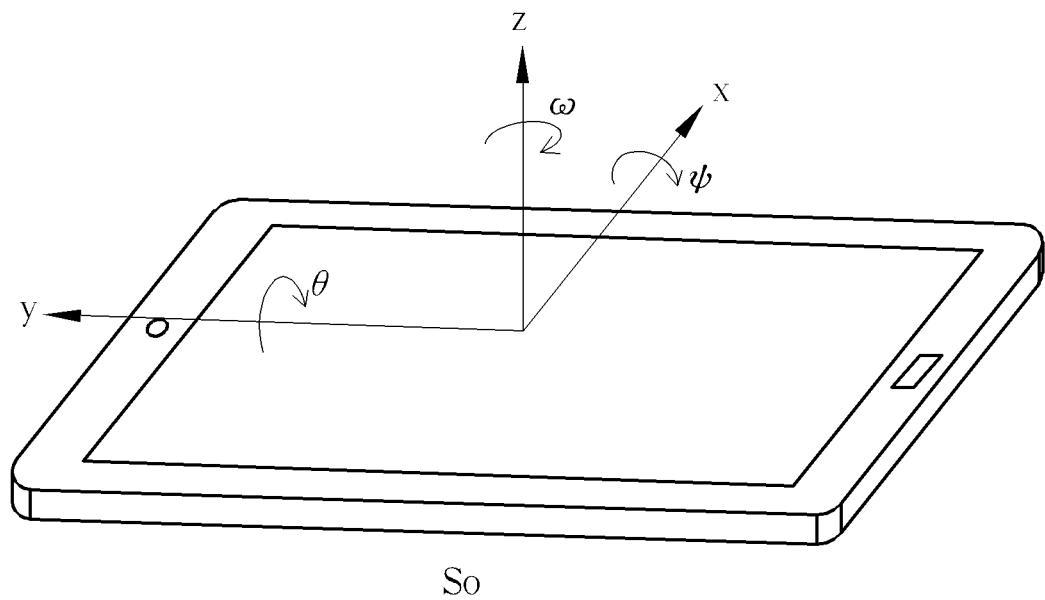
FIG. 5A is a diagram of an electronic device held in an origin position, illustrating three defined axes and three angles of rotation.
Figure 5B:
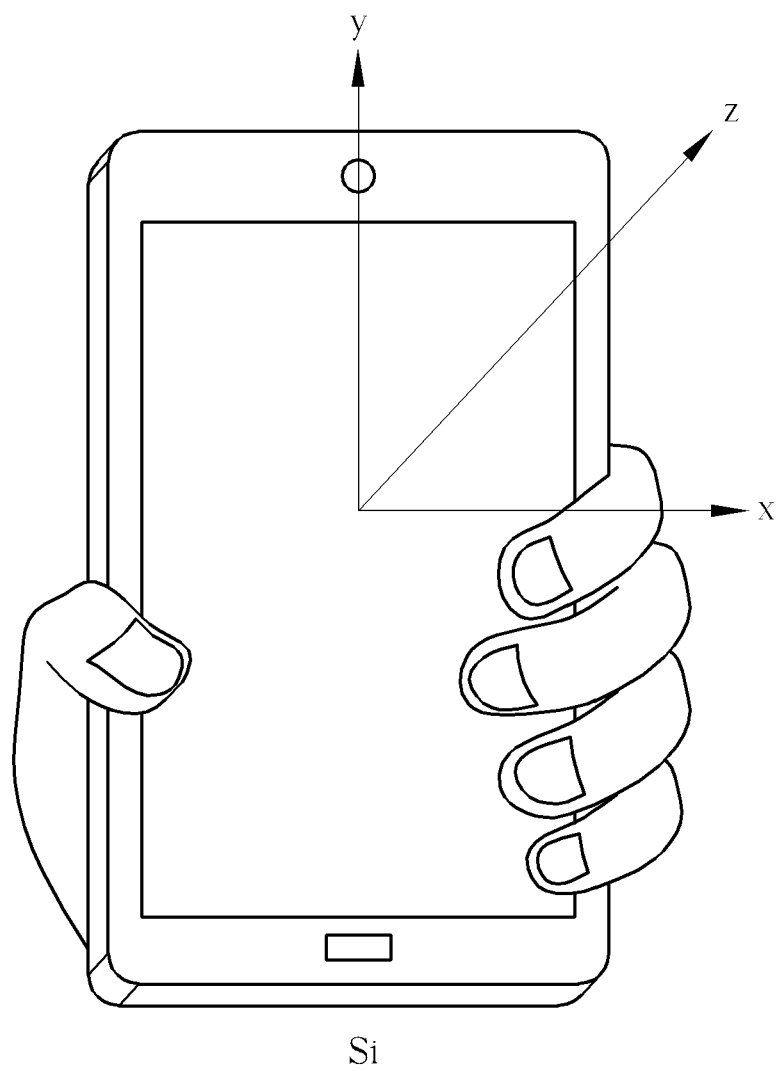
FIG. 5B is a diagram of the electronic device illustrated in FIG. 5A held in an initial position.
Figure 5C:
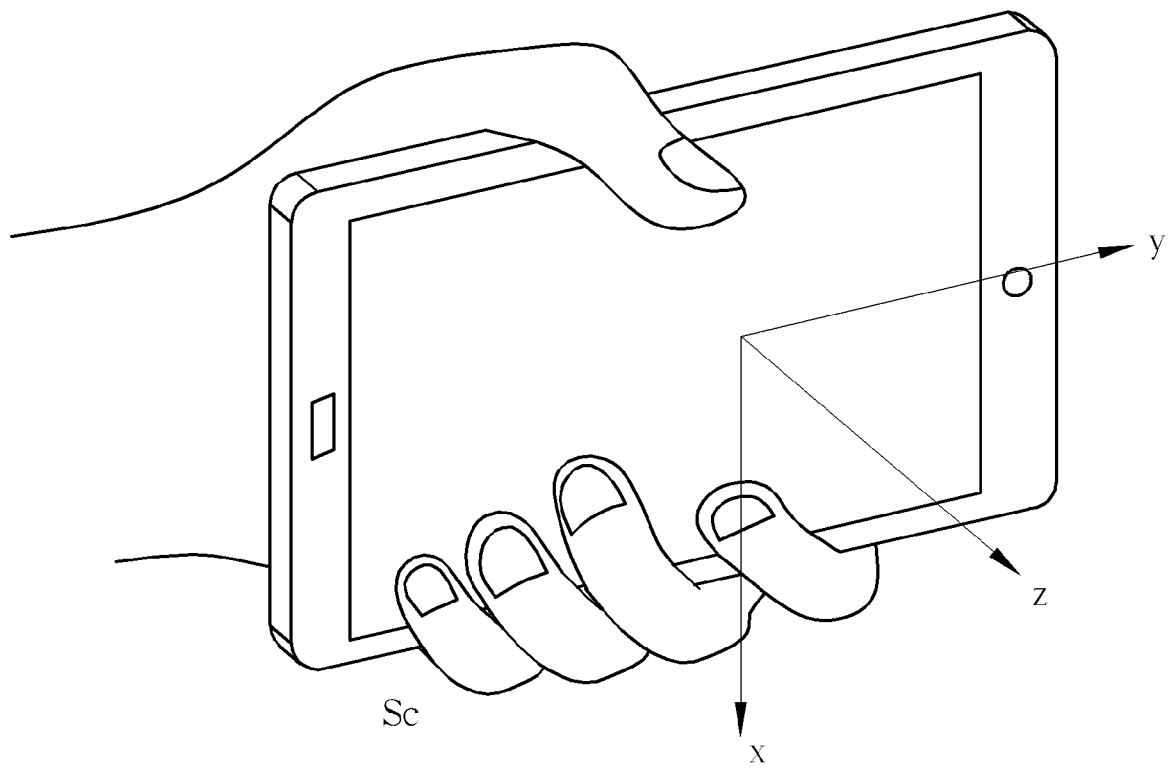
FIG. 5C is a diagram of the electronic device illustrated in FIG. 5A held in a rotated position.

Initially, as illustrated in FIG. 5A, a starting position S0 is defined as a device laying flat on a surface and origin x, y and z gravities are set ($g_{x0}$, $g_{y0}$, and $g_{z0}$). When the device is moved to an upright position Si as illustrated in FIG. 5B, the x, y and z gravities are defined as G sensor values $g_{xi}$, $g_{yi}$, and $g_{zi}$. Then, the device is rotated through 90 degrees to position Sc as illustrated in FIG. 5C, and G sensor values are defined as $g_{xc}$, $g_{yc}$, and $g_{zc}$. The related angles are defined by the following equations:

$$g_{xc} = -g \sin(\omega_c)$$

$$g_{yc} = -g \cos(\phi_c)\cos(\omega_c)$$

$$g_{zc} = g \sin(\phi_c)\cos(\omega_c)$$

wherein g is the earth's gravity.

From the above, we can extrapolate:

$$\varphi_c = -\tan^{-1}\left(\frac{gzc}{gyc}\right)$$

$$\omega_c = -\sin^{-1}\left(\frac{gxc}{g}\right)$$

The Euler angles at both the x and the z axes can therefore be determined. Please note that the above is determined by assuming the y axis does not undergo significant rotation while operating the smart phone or tablet, i.e. $\theta$ approaches zero. The detailed equations regarding the Euler angles are not written in full, as one of ordinary skill in the art will be familiar with the derivations.

In the following, the electronic device is represented by a smart phone 30. Please note that this is merely for illustrative purposes, and the method of the present invention can be equally applied to a tablet, or other electronic device comprising a camera and motion sensors that can perform facial recognition and tracking. Further, various operations such as re-orienting the scanning lines, are performed by a Central Processing Unit (CPU) of the phone, but the CPU is not illustrated in the following diagrams. Orientation information is provided by conventional motion sensors of the smart phone 30; the motion sensors are also not illustrated in the following.

Figure 1A:
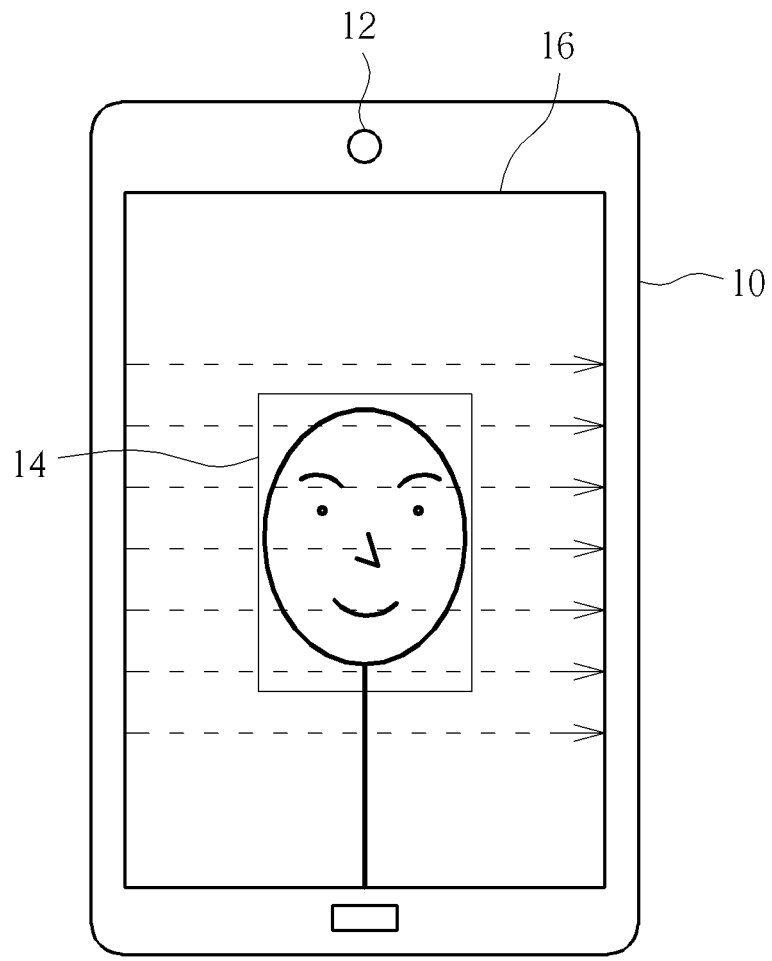
FIG. 1A is a diagram of an image captured by a camera held in a portrait position and a frame and scan lines used to perform face detection according to the prior art.
Figure 1B:
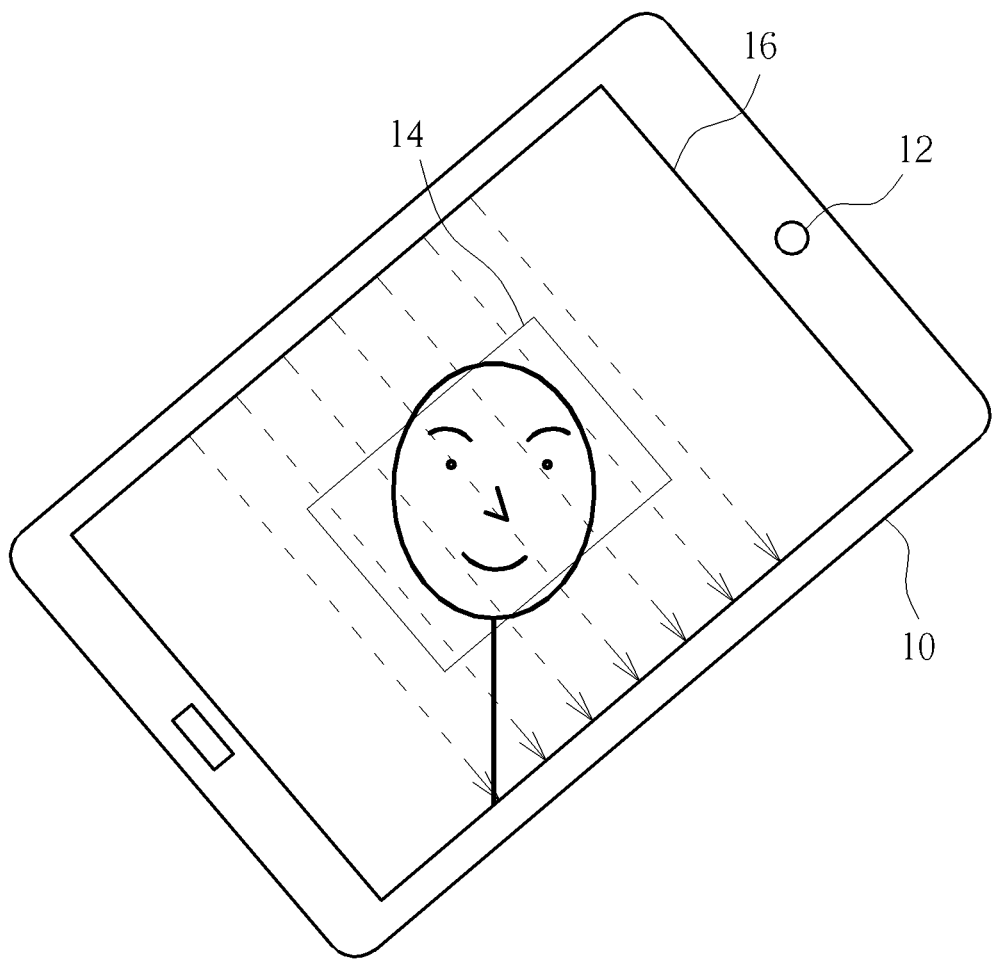
FIG. 1B is a diagram of an image captured by a camera held at 45 degrees to the position shown in FIG. 1A, and a frame and scan lines used to perform face detection according to the prior art.
Figure 1C:
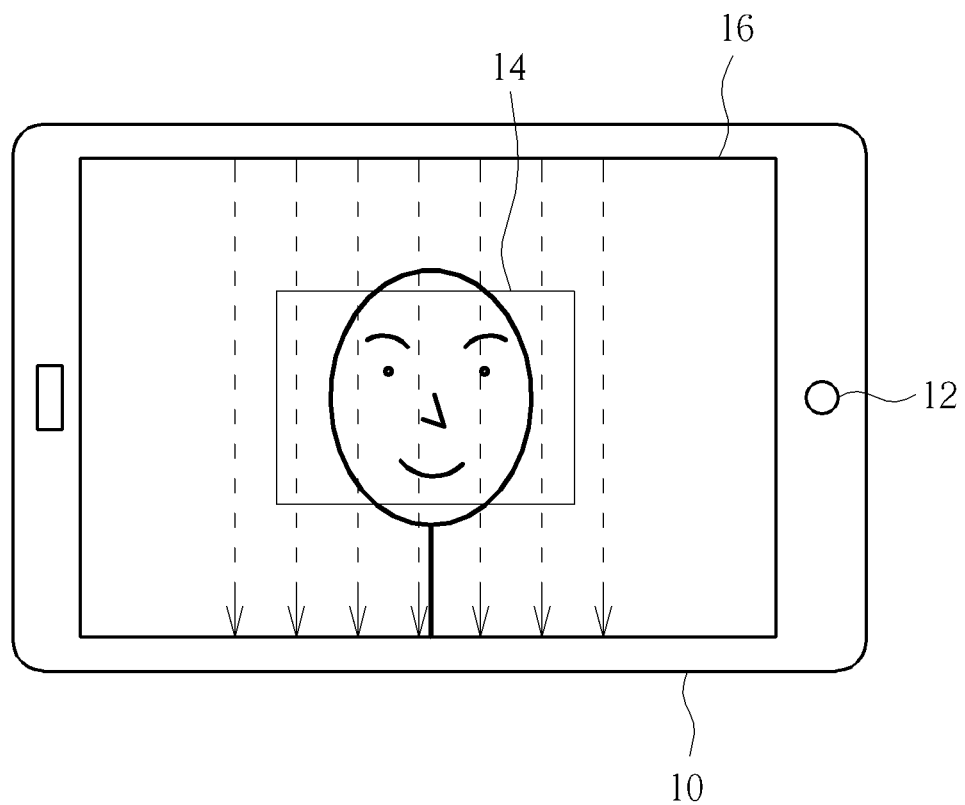
FIG. 1C is a diagram of an image captured by a camera held in a landscape position and a frame and scan lines used to perform face detection according to the prior art.
Figure 2:
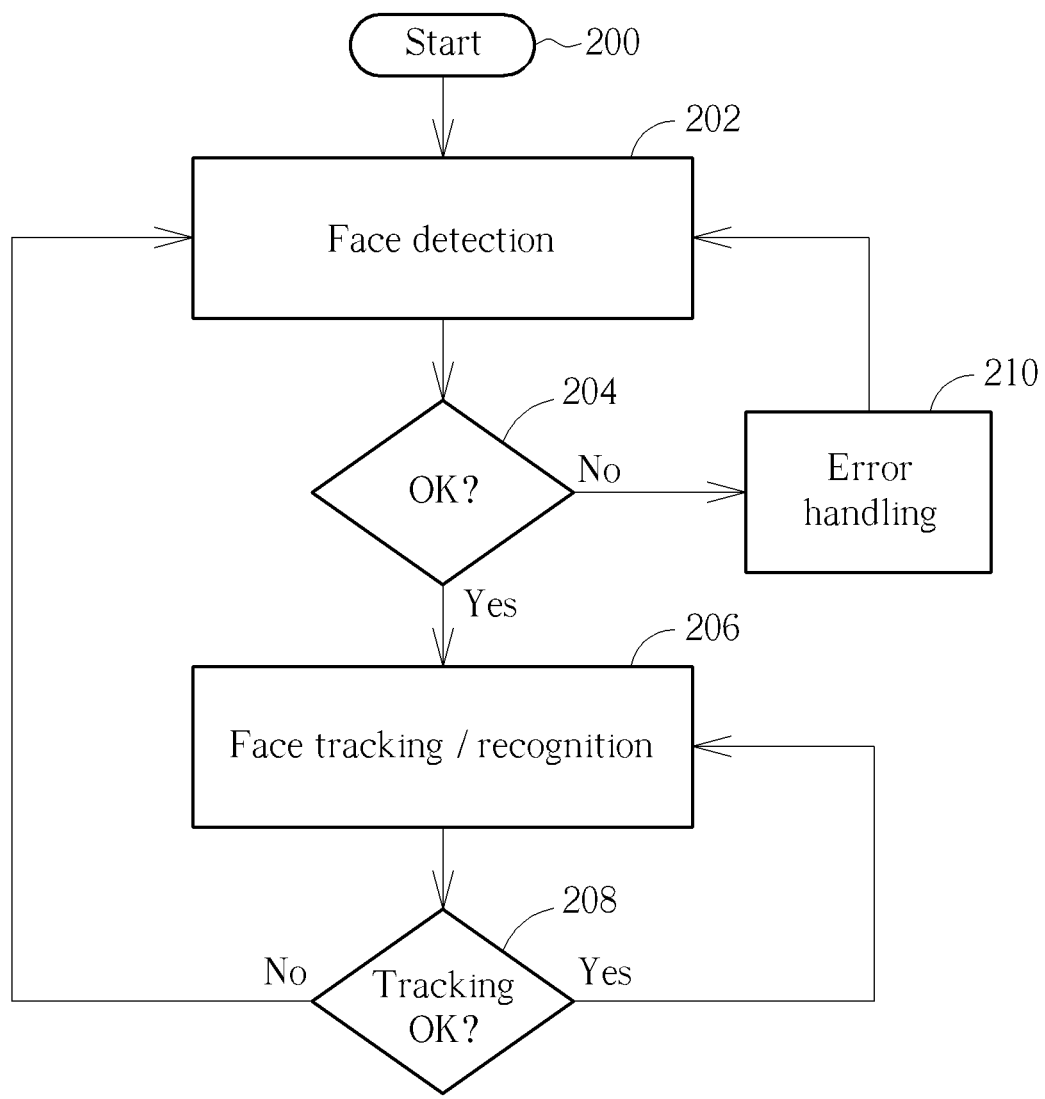
FIG. 2 is a flowchart showing a method of a complete facial tracking/recognition system according to the prior art.
Figure 3A:
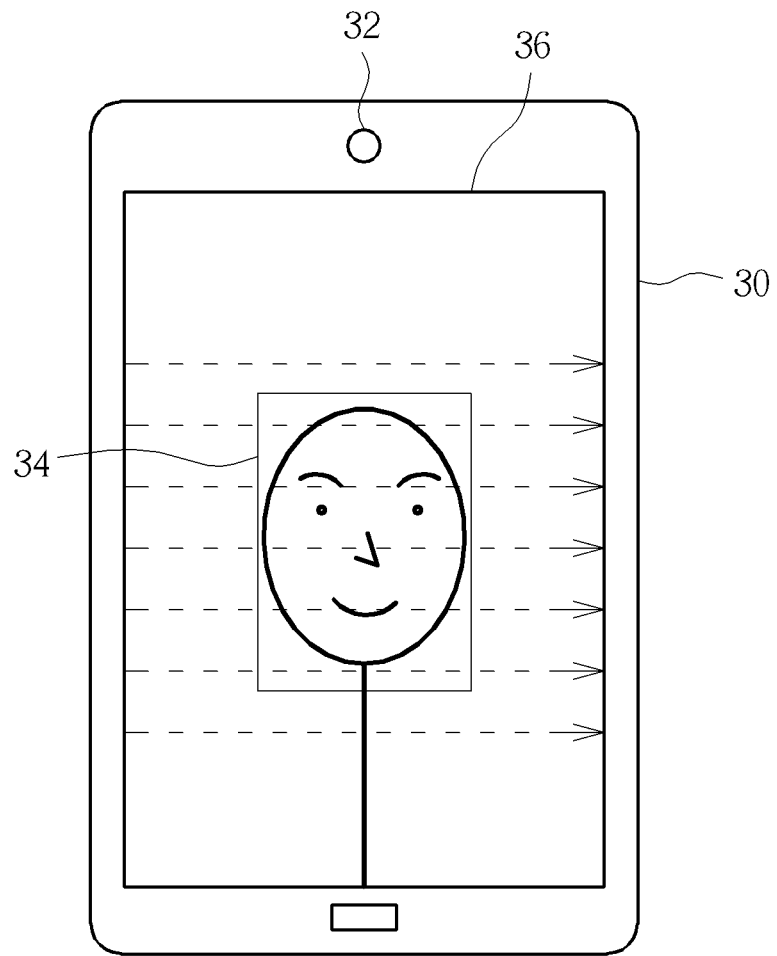
FIG. 3A is a diagram of an image captured by a camera held in a portrait position and a frame and scan lines used to perform face detection according to an exemplary embodiment of the present invention.
Figure 3B:
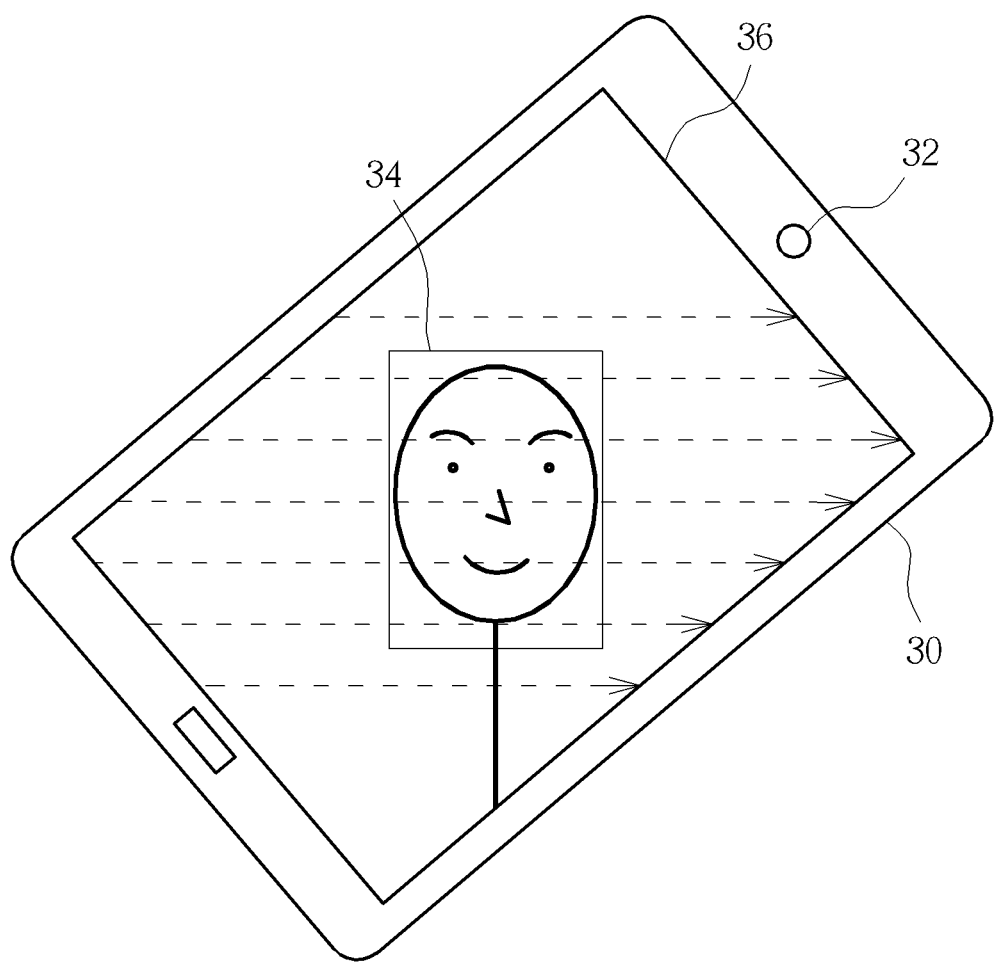
FIG. 3B is a diagram of an image captured by a camera held at 45 degrees to the position shown in FIG. 1A, and a frame and scan lines used to perform face detection according to an exemplary embodiment of the present invention.
Figure 3C:
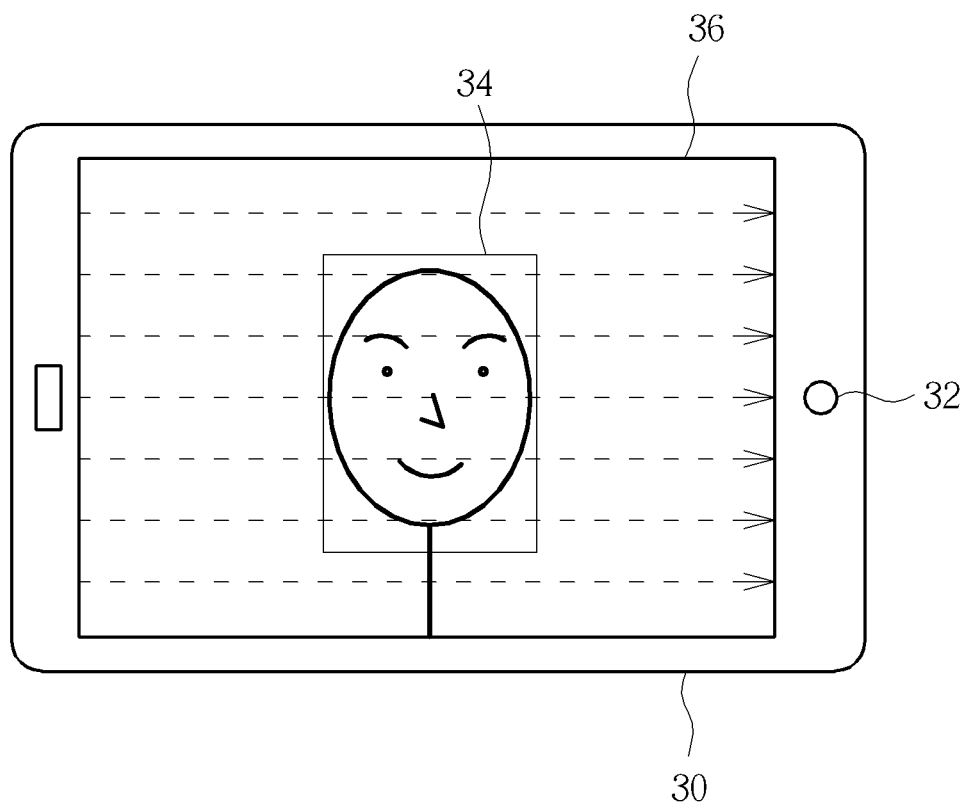
FIG. 3C is a diagram of an image captured by a camera held in a landscape position and a frame and scan lines used to perform face detection according to an exemplary embodiment of the present invention.

FIGS. 3A, 3B and 3C, correspond, respectively, to an image captured by a phone 30 held in a portrait position, an image captured by a phone 30 held at 45 degrees to the original position, and an image captured by a phone 30 held in a landscape position. The phone 30 includes a camera 32 and a display screen 36, and a frame 34 is defined on the display screen 36 wherein face detection will be performed within the frame 34. As illustrated in the diagrams, the direction of the scanning lines and frame 34 used for scanning the image is altered to correspond to the orientation of the phone. Therefore, when the image is captured by the phone 30 held in a landscape position as illustrated in FIG. 3C, the scanning lines will still be horizontal with respect to the captured image, and the scanning area is oriented in a same degree with respect to the image as when the phone 30 is held in the portrait position. Further, when the phone 30 is held at 45 degrees to the original position, the scanning lines will still be oriented to be horizontal with respect to the captured image. In this way, no matter what angle $\omega_c$ corresponds to, the scanning lines will be oriented correctly, such that face detection can be performed correctly.

As detailed in the background section of the specification, when performing tracking using a conventional device, if the image tracking is interrupted (for example, by something appearing between the camera and the image) then face detection must be performed once more. As conventional devices for performing face detection must have the camera and phone oriented in the portrait position, the phone must be returned to position Si before restarting the face detection/facial tracking or recognition process, thereby causing some inconvenience to the user. The device and method of the present invention, however, can utilize the orientation information to correctly perform face detection in whatever position the phone is held in. Therefore, although face detection must be performed again when tracking is interrupted, the user does not need to change the position of the phone.

Figure 4:
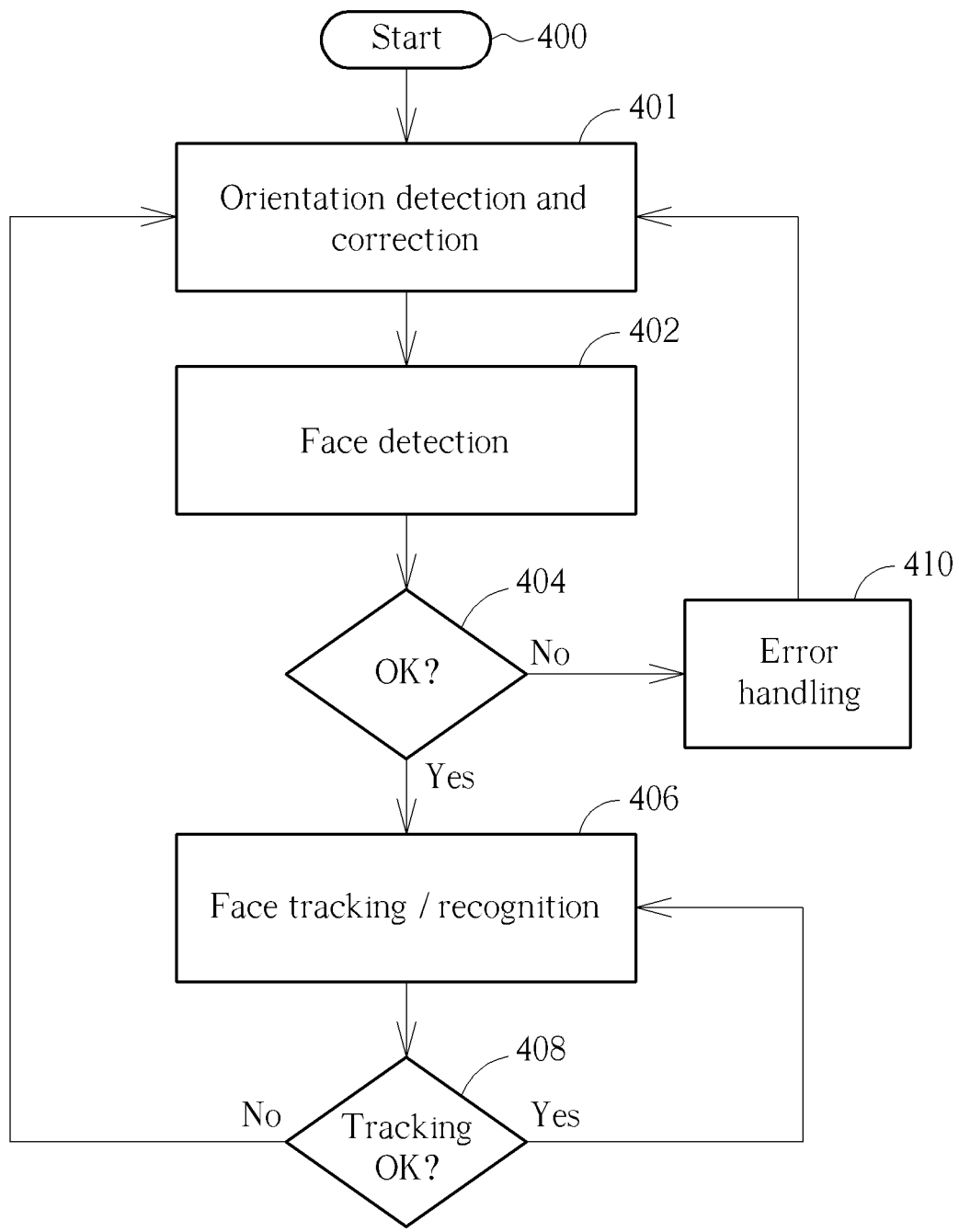
FIG. 4 is a flowchart showing a method of a complete facial tracking/recognition system according to an exemplary embodiment of the present invention.

Please refer to FIG. 4, which is a diagram illustrating an exemplary method according to the present invention. The steps are as follows:

Step 400: Start.
Step 401: Perform orientation detection and correction.
Step 402: Face detection.
Step 404: Is face detection ok? If yes, go to Step 406; if no, go to Step 410.
Step 406: Perform face tracking.
Step 408: Is face tracking ok? If yes, return to Step 406; if no, go back to Step 402.
Step 410: Perform error handling; go to Step 202.

As illustrated in the above method, as the scanning lines are oriented in accordance with an orientation of the device, face detection can be performed at any orientation of the device. Therefore, when tracking is interrupted, although the flow must go back to the face detection step, the phone does not need to be returned to the portrait position, as the orientation information will be used to enable face detection to be performed at any angle the device is held.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing facial recognition and tracking of an image captured by an electronic device, the method comprising:
   utilizing a camera of the electronic device to capture an image including at least a face;
   displaying the image on a display screen of the electronic device;
   determining a degree of orientation of the electronic device; and
   adjusting an orientation of scanning lines used to scan the image for performing face detection so that the orientation of the scanning lines corresponds to the orientation of the electronic device, wherein the orientation of the scanning lines maintains to be horizontal and in a same degree to the orientation of the captured image, regardless of the orientation of the electronic device.

2. The method of claim 1, further comprising:
   when face detection is confirmed, initiating a facial tracking/recognition mechanism of the electronic device; and
   when tracking is interrupted, re-performing face detection by determining a new degree of orientation of the electronic device and adjusting an orientation of the scanning lines to correspond to the new orientation of the electronic device.

3. The method of claim 1, wherein the step of determining a degree of orientation of the electronic device comprises:
   defining three axes of orientation of the electronic device in an origin position and in an initial position, and when the electronic device is moved from the initial position to a new position, determining a degree of rotation of at least two of the defined axes.

4. The method of claim 3, wherein the origin position corresponds to the electronic device being held in a flat position, and the initial position corresponds to the electronic device being held in an upright portrait position.

5. The method of claim 3, wherein it is assumed that a degree of rotation in the other of the three defined axes approaches zero.

6. An electronic device which can perform facial recognition and tracking of an image, comprising:
   a camera for capturing an image including at least a face;
   a display screen for displaying at least the image;
   a motion sensor for determining a degree of orientation of the electronic device; and
   a Central Processing Unit (CPU) for adjusting an orientation of scanning lines used to scan the image for performing face detection so that the orientation of the scanning lines corresponds to the orientation of the electronic device, wherein the orientation of the scanning lines is horizontal and in a same degree with respect to the orientation of the captured image when the electronic device is held at 45 degrees, the face detection is capable of being performed at any orientation of the electronic device.

7. The electronic device of claim 6, wherein when face detection is confirmed, a facial tracking/recognition mechanism of the electronic device can be initiated, and when tracking is interrupted, the electronic device re-performs face detection by determining a new degree of orientation of the electronic device and adjusting an orientation of the scanning lines to correspond to the new orientation of the electronic device.

8. The electronic device of claim 6, wherein the degree of orientation of the electronic device is determined by the motion sensor defining three axes of orientation of the electronic device in an origin position and in an initial position, and when the electronic device is moved from the initial position to a new position, a degree of rotation of at least two of the defined axes is determined.

9. The electronic device of claim 8, wherein the origin position corresponds to the electronic device being held in a flat position, and the initial position corresponds to the electronic device being held in an upright portrait position.

10. The electronic device of claim 8, wherein it is assumed that a degree of rotation in the other of the three defined axes approaches zero.

* * * * *